(12) United States Patent
Irniger et al.

(10) Patent No.: US 8,256,174 B2
(45) Date of Patent: Sep. 4, 2012

(54) TOWER CONSTRUCTION

(75) Inventors: Philipp Irniger, Hausen (CH); Reto Clenin, Hagenbuch (CH)

(73) Assignee: Sika Technology AG, Baar (CH)

( * ) Notice: Subject to any disclaimer, the term of this patent is extended or adjusted under 35 U.S.C. 154(b) by 909 days.

(21) Appl. No.: 11/992,236

(22) PCT Filed: Sep. 22, 2006

(86) PCT No.: PCT/EP2006/066631
§ 371 (c)(1),
(2), (4) Date: Sep. 9, 2008

(87) PCT Pub. No.: WO2007/033991
PCT Pub. Date: Mar. 29, 2007

(65) Prior Publication Data
US 2009/0025304 A1 Jan. 29, 2009

(30) Foreign Application Priority Data
Sep. 23, 2005 (EP) .................................... 05108817

(51) Int. Cl.
*E04B 2/48* (2006.01)
*E04B 2/42* (2006.01)
(52) U.S. Cl. ............. 52/245; 52/249; 52/223.3; 52/381; 52/383
(58) Field of Classification Search .................... 52/245, 52/249, 247, 381, 382, 383, 612, 223.3, 378, 52/379, 396.08, 742.13, 742.16
See application file for complete search history.

(56) References Cited

U.S. PATENT DOCUMENTS

| | | | | |
|---|---|---|---|---|
| 1,194,305 A | * | 8/1916 | McMillan | 52/245 |
| 2,032,852 A | * | 3/1936 | Powell | 52/396.08 |
| 2,305,112 A | * | 12/1942 | Scott | 425/195 |
| 3,483,704 A | * | 12/1969 | Tabor | 405/152 |
| 3,488,965 A | * | 1/1970 | Chesnov | 405/151 |
| 3,815,370 A | * | 6/1974 | Lennox | 405/152 |

(Continued)

FOREIGN PATENT DOCUMENTS
DE  29 52 774 A1  7/1981
(Continued)

OTHER PUBLICATIONS

Nov. 29, 2011 Office Action issued in Japanese Patent Application No. 2008-531711 (with English Translation).

*Primary Examiner* — Phi D. A (74) *Attorney, Agent, or Firm* — Oliff & Berridge, PLC (57) ABSTRACT

The invention relates to a tower construction with an annular cross section, comprising one or more component tubes arranged concentrically one on top of the other, wherein at least one component tube is composed of at least 3 tube segments, the tube segments of at least one component tube are pretensioned relative to one another by means of tensioning devices, hereinafter referred to as segment tensioning devices, and the component tubes have tensioning devices, hereinafter referred to as component tube tensioning devices, which act at least in the axial direction and extend over at least one horizontal joint, the tube segments and the component tubes composed therefrom form, at their butting edges, joints having gaps, the gaps of the joints are filled at least partially with a joint-filling material, and the joints between the tube segments of the same component tube allow a certain, substantially constraint-free rotation of the adjoining tube segments about the joint axis.

36 Claims, 4 Drawing Sheets

U.S. PATENT DOCUMENTS

| | | | | |
|---|---|---|---|---|
| 3,951,294 A | * | 4/1976 | Wilson | 220/4.31 |
| 4,324,081 A | * | 4/1982 | Chicha | 52/432 |
| 4,463,872 A | * | 8/1984 | Yellowlees | 220/592 |
| 4,726,567 A | * | 2/1988 | Greenberg | 256/19 |
| 4,769,961 A | * | 9/1988 | Gillet | 52/245 |
| 5,038,540 A | * | 8/1991 | Krautz | 52/245 |
| 5,168,682 A | * | 12/1992 | Rye | 52/309.17 |
| 6,715,243 B1 | * | 4/2004 | Fons | 52/192 |
| 2004/0049999 A1 | * | 3/2004 | Krieger | 52/245 |
| 2004/0074171 A1 | | 4/2004 | Wobben | |

FOREIGN PATENT DOCUMENTS

| | | |
|---|---|---|
| JP | A-55-032813 | 3/1980 |
| JP | A-03-140566 | 6/1991 |
| JP | A-06-264519 | 9/1994 |
| JP | A-11-172964 | 6/1999 |
| JP | A-2004-011210 | 1/2004 |

* cited by examiner

Section A1 - A1

FIG 5

Section B1 - B1

FIG 6

Section A2 - A2

FIG 7

Section B2 - B2

FIG 8

Section A3 - A3

FIG 9

Section B3 - B3

FIG 10

Section A4 - A4

FIG 11

Section B4 - B4

FIG 12

Section A5 - A5

FIG 13

Section B5 - B5

TOWER CONSTRUCTION

TECHNICAL FIELD

The invention relates to a tubular tower construction which has an annular cross section and is composed of a plurality of identically shaped structural components.

PRIOR ART

It is known practice, for example, to produce tower constructions for wind power or telecommunications installations from steel parts, wherein the outer walls of these tower constructions consist of bent sheet metal plates and a plurality of component tubes are then placed on top of one another in order to form the overall tower construction. The individual component tubes are connected to one another here by means of flanges. It is also known practice for such tower constructions to be produced from reinforced concrete in situ using climbing or sliding formwork or from reinforced concrete elements, wherein the reinforcement must in each case be installed prior to the concrete being poured. Such reinforcement is time-consuming and costly to produce. Moreover, even a correctly dimensioned reinforcement cannot prevent the cracks induced by stresses, but merely influence the number of cracks and the crack widths.

SUMMARY OF THE INVENTION

It is the object of the invention to propose a tower construction which reduces thermally induced stresses in the tower structure and thus the tendency toward crack formation, and allows the use of fiber concrete. The proposed supporting construction should additionally comprise simple, easy-to-transport and, as far as possible, identical structural components which can be produced by mass production.

This object is achieved by the features of the independent patent claim. Advantageous developments of the invention form the subject of subordinate claims.

The inventors have recognized that it is possible to produce a tower construction of annular cross section from prefabricated parts made of fiber concrete. For this purpose, the overall tower construction is subdivided into a plurality of component tubes which for their part comprise a plurality of tube segments which are prefabricated from concrete, preferably fiber concrete. The individual tube segments are assembled to form a complete ring either at the factory or on the building site. The joints between the tube segments of one and the same component tube have a certain capacity to rotate about the joint axis. To provide stability for this construction of a component tube, permanent bracing devices are mounted in the circumferential direction and hold the individual tube segments together to form a component tube. The overall tower structure can be built up by stacking a plurality of component tubes on top of one another. The joints between the individual component tubes are for their part filled with joint filling material and the component tubes are braced together with one another by means of vertical bracing. As a result of this construction method, the thermally induced stresses along the circumference are negligible and are no longer decisive for the reinforcement.

It is advantageous to place the vertical joints of an annular cross section in the continuation of the vertical joints of an annular cross section situated below. The annular bracing can be applied externally or internally, with or without bonding. The vertical joints or so-called pivot joints allow a relatively unconstrained rotation between two adjoining tube segments about the axis of the joint. At the same time, the pivot joints ensure the transmission of shear and normal forces between two adjoining tube segments. The pivoting action in horizontal section is achieved by the joint filling material either via the planar contact surface between the adjoining tube segments, by shaped parts (for example by shear dowels or by an inserted pivot pin), by shaping which allows precise mating, by shaping which allows precise mating in part, or by a combination of the stated measures.

The termination of the tube segments in the region of the joints can thus also consist of separately produced shaped parts. These shaped parts can consist of the same material as the tube segment or from another, preferably more resistant material (for example UHPC). The shaped parts can be laid in the formwork beforehand or be subsequently applied to the end face of the tube segment by means of adhesive or mortar. The transfer of shear forces in vertical section is thus ensured in the case of a planar joint by the joint filling material, by shear dowels, by shaping which allows precise mating or precise mating in part, or by a combination of these measures. The joint filling material used can preferably be adhesive, mortar or sheeting. In particular, the properties of the joint filling materials can also be selected to be variable over the joint cross section. Different joint filling materials can also be used. It is also possible to dispense with a joint filling material over partial surfaces of the cross-sectional area of the joint.

The horizontal joints can be formed analogously to the vertical or pivot joints.

Through this configuration, and as a result of the joints, in particular the vertical joints, which are designed to be able to pivot within limits, the tower is substantially statically determinate in cross section without the supporting properties, in particular the strength, the deformation and the stability of the overall tower construction, being impaired. Furthermore, an advantage when using fiber concrete is that it is possible to eliminate the expensive production and the complicated installation of the steel reinforcement which is fabricated separately for each tower section. By comparison with the tower constructions conventionally produced using concrete, this construction has a significantly lesser tendency toward crack formation and can be produced with great precision using relatively small and mass-produced component elements.

Following this basic idea, the inventors propose a tower construction which has an annular cross section and comprises one or more component tubes arranged concentrically on top of one another, wherein at least one component tube is built up from at least three tube segments, wherein furthermore the tube segments of at least one component tube are prestressed relative to one another by means of bracing devices, termed segment bracing devices below, and the component tubes have bracing devices, termed component tube bracing devices below, which act at least in the axial direction and extend over at least one horizontal joint. The tube segments and the component tubes composed thereof form, at their butting edges, joints with gaps, wherein the butting edges are shaped at least in part in such a way that they produce, directly or with the aid of an additional shaped element, a positive locking connection which acts in at least one direction, wherein the gaps of the joints are filled at least in part with a joint filling material.

The tower construction can advantageously be designed in such a way that at least one joint between at least two tube segments extends in the vertical direction. Alternatively, the possibility also exists of designing such a joint obliquely so that there results a sort of spiral profile for the joints. Furthermore, at least one joint between two component tubes can also be arranged in the horizontal direction.

In one particular variant embodiment of the tower construction, vertical and/or horizontal butting edges can be formed at least in part in such a way that they form, directly or with the aid of an additional shaped element, a positive locking connection which acts in at least one direction. These positive locking connections between the individual tube segments result in a higher degree of strength, in particular shear strength, than in the case of simple smooth joints. The shaping given to such positive locking connections is generally known and there is no limitation in principle in these variants, although it is advantageous to configure them in such a way that they can be produced by simply casting the tube segments.

With respect to the component tube bracing devices, it is possible to allow these to extend at least in part inside the walls of the component tubes or the tube segments; however, the possibility also exists of arranging these component tube bracing devices outside the walls of the component tubes. The component tube bracing device can act at least in part in a bonded relationship with the component tubes.

With regard to the segment bracing devices, the possibility also exists that these devices extend at least in part inside the walls of the component tubes; however, it may be advantageous, in particular with regard to the production process, to arrange the segment bracing devices at least in part outside the walls of the component tubes. The segment bracing device can act at least in part in a bonded relationship with the tube segments.

As joint filling material it may be advantageous to use elastic filling material at least in some joints, although it is pointed out that different joints can also have different filling material. The joint material used can be, for example, adhesive, mortar or else sheeting. In one particular embodiment, even the joint filling material can be formed in such a way that it has properties which differ over the cross section of the filled joint.

With regard to the arrangement of the joints in the tower construction, the inventors propose in one particularly advantageous variant that the joints of the component tubes extending along the wall in the vertical direction are arranged in alignment with one another.

Furthermore, it is proposed that the positive locking connections have, at least in part, interlocking profiles between the tube segments. It is also possible to equip the positive locking connections at least in part with mutually complementary profiles or non-complementary profiles between the tube segments.

A further possibility for a positive locking connection comprises forming an additional shaped element, a tongue and groove connection, between the tube segments. In other words the two abutting tube segments each have a groove into which an additional shaped element is inserted, thereby preventing a displacement of the tube segments relative to one another. It is advantageous here if such shaped elements are produced from the same material as the tube segments, since problems which could be caused by different coefficients of expansion are thus eliminated from the outset. However, if this problem is not of prime concern, and instead a specific tensile strength is required for such shaped elements, for example if such a shaped element is also used in combination as a bracing device at the same time, it can be advantageous to produce it from metal.

In a particularly advantageous manner, the tube segments are produced from fiber concrete, since no particular reinforcement is generally necessary in this case. However, it is pointed out that the scope of the invention also covers the situation where, in order to increase the strength, additional reinforcements are incorporated in the tube segments or where these consist exclusively of reinforced concrete. Such an additional reinforcement can be particularly advantageous when it is arranged exclusively in the region adjoining the joints. With respect to the formation of the tower construction, it can also be advantageous within the scope of the invention if vertical joints are dispensed with at least one end of the tower construction, that is to say a component is used which is free of such joints; for example, it can be produced in a conventional manner.

The tower construction per se, and hence the component tubes too, can have a cylindrical or conical design, for example. It is also possible in principle to stack on top of one another component tubes which, although being of cylindrical design, have a smaller radius with increasing height. This results in corresponding offsets at the abutment points of the individual component tubes.

The tower construction according to the invention can, for example, be a part of a wind power installation or of a telecommunications installation or of a lighthouse, or it can else be used to build a chimney or a cooling tower.

BRIEF DESCRIPTION OF THE DRAWINGS

The invention will be described in more detail below with reference to preferred exemplary embodiments with the aid of the figures, only those features necessary for understanding the invention being represented. Like elements are provided with the same reference numbers in the various figures.

Specifically.

MANNER OF IMPLEMENTING THE INVENTION

Figure 1:
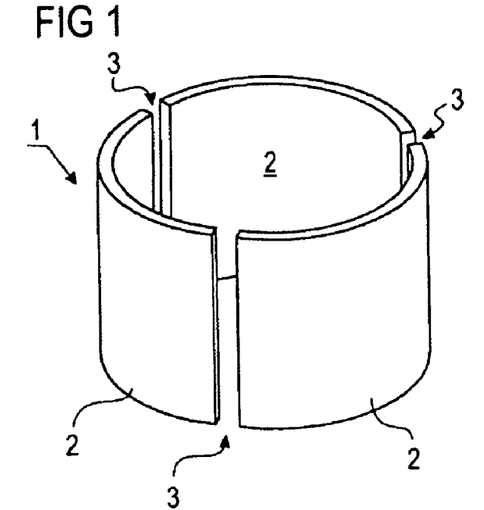
FIG. 1 shows a 3D representation of the composition of a component cylinder made up of cylinder segments.
Figure 2:
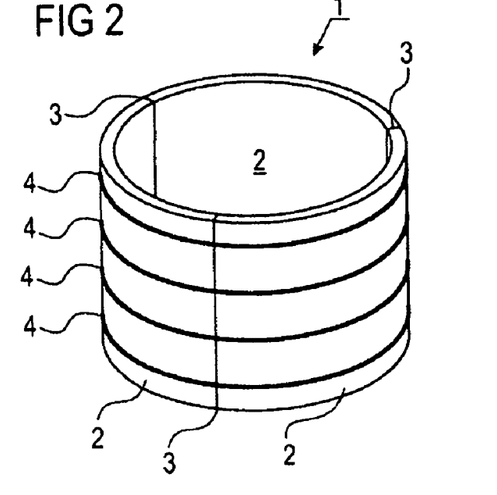
FIG. 2 shows a component cylinder with annular bracing.
Figure 3:
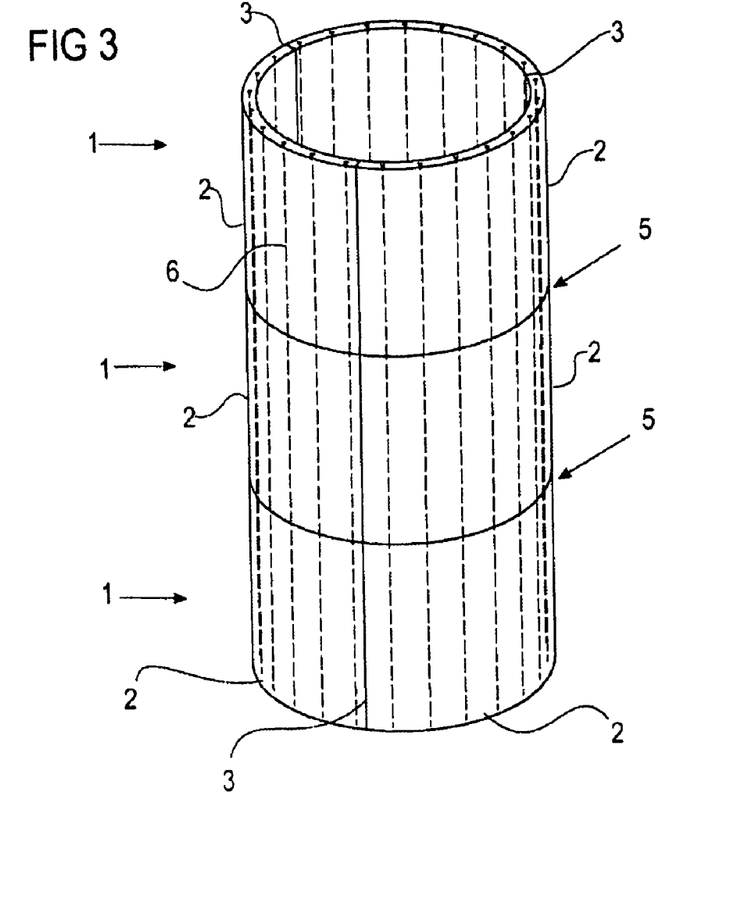
FIG. 3 shows a tube construction composed of three component cylinders with vertical bracing.

FIGS. 1 to 3 are intended to represent the basic formation of the tower construction according to the invention, it being pointed out that although a cylindrical tower construction is shown exclusively in this example, it is readily possible in an analogous manner to erect a conical tower construction. Likewise, a tower construction having upwardly tapering component cylinders can also be set up. FIG. 1 shows a 3D representation of the composition of a component cylinder 1 made up of three cylinder segments 2. Joints 3 which are filled by an appropriate joint filling material are formed between the cylinder segments 2. These cylinder segments represented here are, as is shown in FIG. 2, pressed tightly against one another and held together with the aid of a plurality of annular braces 4. The annular braces 4 ensure that the entire component cylinder 1 is held firmly, although the joints 3, which are also termed pivot joints, provide a certain capacity to rotate about the joint axis.

To erect the overall tower construction, a plurality of such component cylinders from FIG. 2 are then stacked on top of one another, resulting in a complete tower construction, as is represented in FIG. 3. However, it is pointed out that the tower construction can also be erected by successively assembling individual tube segments on top of one another. It is thus not absolutely necessary to build complete component tubes first and stack them on top of one another as prefabricated units; what is important is the overall constructional formation. It is further pointed out that the tower construction can also comprise only a single component tube.

To ensure the interaction, in particular with respect to tensile stressing, between the individual component cylinders 1, vertical bracing elements 6 are inserted which connect the individual component cylinders to one another. Use can be made here for example of bracing elements which extend over the entire height of the tower construction and connect all component cylinders to one another. However, there also exists the possibility of using relatively short, vertical bracing elements which connect merely a few, but at least two, component cylinders to one another or anchor a component cylinder in the tower foundation. By alternately connecting component cylinders situated above and below, all the component cylinders can be connected to one another as a whole.

The joints 5 extending horizontally between the individual component cylinders can, as is shown in the example here, have a smooth design just like the vertical joints 3 of the component segments; here too, a joint filling material should be introduced into the horizontal joints.

Owing to the manner of construction of this tower, there is a certain capacity between the individual segments to rotate about the joint axis of the vertical joints 3, with the result that the stresses, in particularly thermally induced stresses, in the tower structure, and hence the tendency toward cracking, are reduced.

FIGS. 4 to 13 which follow represent various examples of the formation of the joint; although the representation is limited to the vertical joints between the individual component segments, it comes within the scope of the invention to use the same or similar joint constructions for the horizontally extending joints between the individual component cylinders as well. By contrast with the vertical joints, the rotational capacity between the adjoining component cylinders plays a minor role in the case of the horizontal joints.

Figure 4:
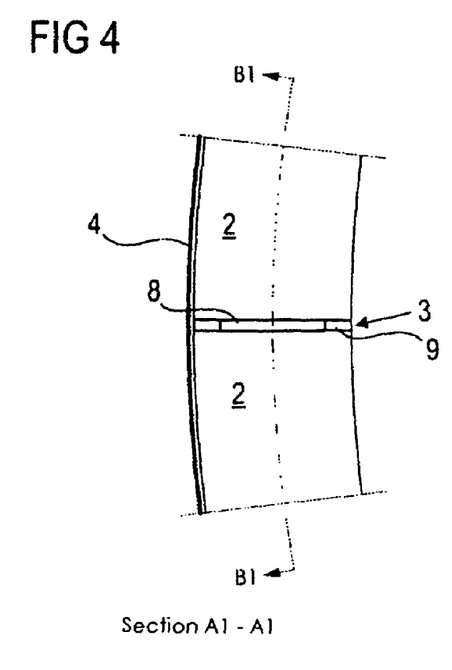
FIG. 4 shows a detail view of a butting edge between two cylinder segments in horizontal cross section.

FIG. 4 shows a horizontal cross section through a vertical joint 3 between two cylinder segments 2. This joint 3 is of completely smooth design, with a filling material 8 being introduced in the joint gap 9 and ensuring a preferably pivot-like connection between the individual cylinder segments. In the present case, a transverse displacement of the individual cylinder segments is prevented exclusively by the peripheral annular bracing 4 and the cylinder geometry of the construction, in conjunction with the shear strength of the joint filling material.

Figure 5:
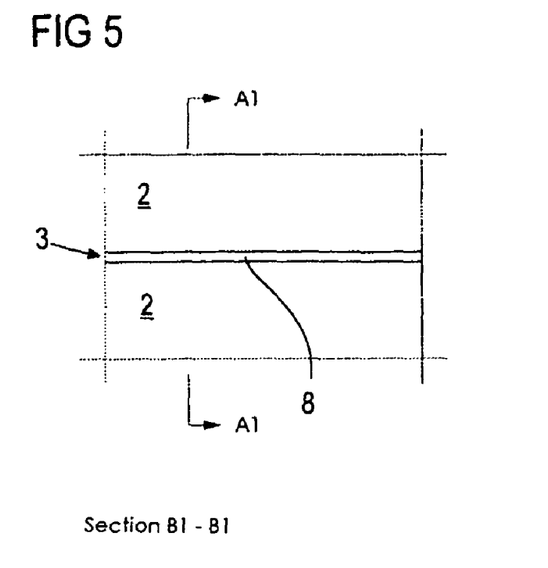
FIG. 5 shows a vertical section with respect to FIG. 4.

FIG. 5 shows the same joint 3 as in FIG. 4, but in a vertical section. It can be observed, here too, that the joint 3 merely has a smooth structure.

Figure 6:
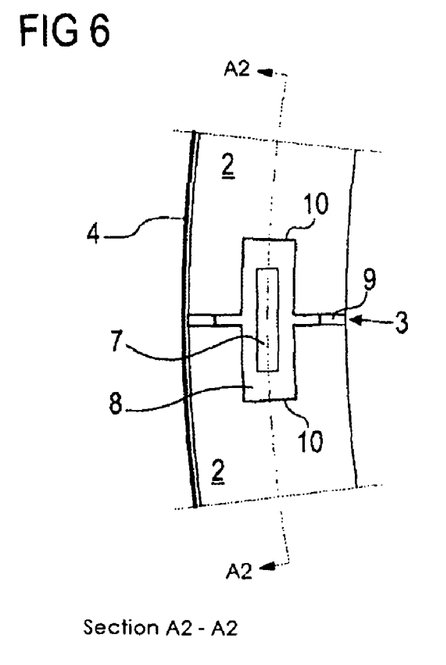
FIG. 6 shows a horizontal section through a joint between two cylinder segments according to the tongue and groove principle.
Figure 7:
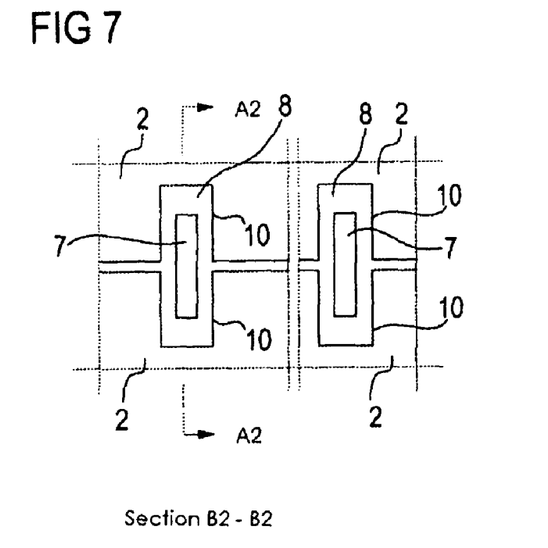
FIG. 7 shows a joint from FIG. 6 in vertical section.

An example of a positive locking connection between the individual cylinder segments in combination with an additional shaped part is represented in FIGS. 6 and 7. FIG. 6 for its part shows a horizontal cross section of a detail view in the immediate surroundings of a vertical joint 3. The two cylinder segments 2 each have a groove 10 in which a shaped part 7 is inserted. The remaining clearance here is filled by joint filling material 8. The geometric arrangement of the shaped part 7 enables the two cylinder segments to be well secured against a relative transverse displacement in the radial direction, with the result that the joint filling material 8 can substantially provide for the rotational capacity of the connection about the axis of the joint 3 without absolutely needing to have strongly adhesive properties.

FIG. 7 shows the joint from FIG. 6, but in a vertical section. It can be seen here that further individual grooves are arranged in the vertical direction, in which grooves have likewise been introduced shaped parts 7 which have the function of substantially preventing a vertical displacement between the segments. Here too, joint filling material 8 is inserted in the clearance 9 surrounding the shaped elements 7.

Figure 8:
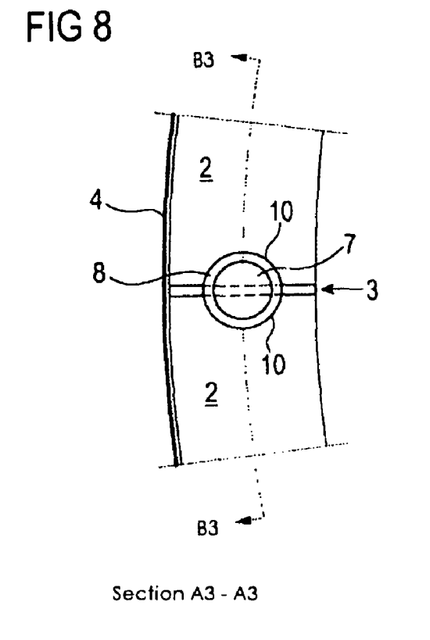
FIG. 8 shows a vertical joint between two cylinder segments with a cylindrical shaped element in the joint.
Figure 9:
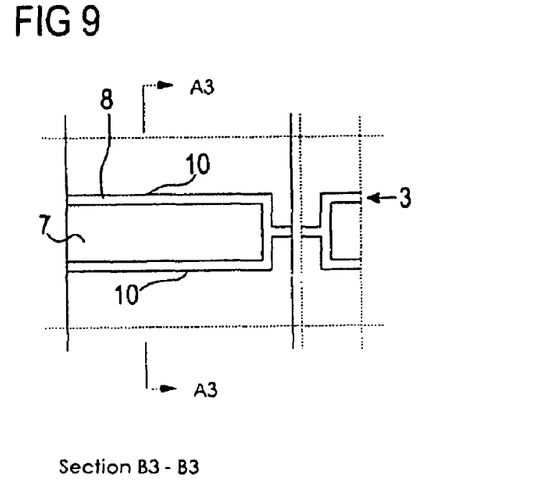
FIG. 9 shows a joint from FIG. 8 in vertical section.

Instead of the shaped element 7 of the embodiment shown in FIGS. 6 and 7, which has a similar design to a flat bar, it is also possible by way of example to use a round bar, as is shown here in the example of FIGS. 8 and 9. The vertically extending groove 10 in the abutment region of the cylinder segments has a semicircular design here, a shaped element 7 in the form of a round bar being inserted into this groove. Such a connection can also absorb high transverse forces in the radial direction and at the same time allow a certain rotational capacity about the axis of the joint 3. FIG. 9 for its part shows the vertical section through the joint 3 of FIG. 8, it being evident that the shaped element 7 does not extend over the entire height of the cylinder segment, but is arranged only over a partial length.

Figure 10:
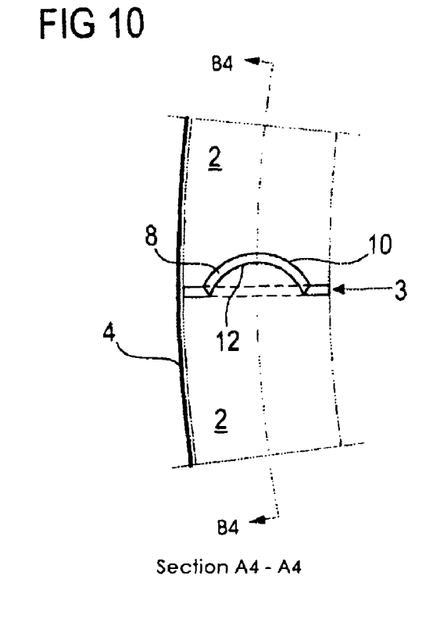
FIG. 10 shows a vertical joint between two cylinder segments with complementary shaping of the butting edges of the cylinder segments.
Figure 11:
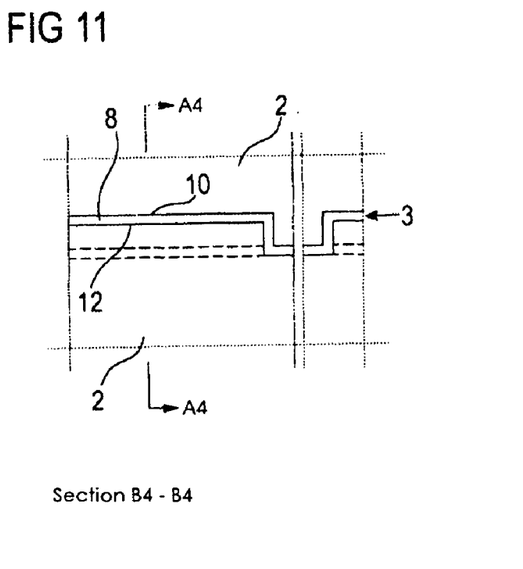
FIG. 11 shows a joint from FIG. 10 in vertical section.

Another example of a positive locking joint connection between the cylinder segments is represented in FIGS. 10 and 11. FIG. 10 shows a cross section in the region of a vertical joint 3, with an approximately semicircular groove 10 being cut out in the region of the cylinder segment 2 which is represented at the top, while a complementary semicircular elevation 12 is formed on the cylinder segment 2 represented at the bottom. Here too, joint filling material 8 is introduced in the joint gap 9.

In the exemplary embodiment represented here, this positive locking connection does not extend over the entire height of the cylinder segment, but only over a partial length, as can be seen in FIG. 11, which represents a vertical section of this joint. This embodiment additionally achieves a positive locking connection between the cylinder segments which leads to a positive lock not only in the radial direction but also produces a positive lock between the individual cylinder segments in the axial direction.

Figure 12:
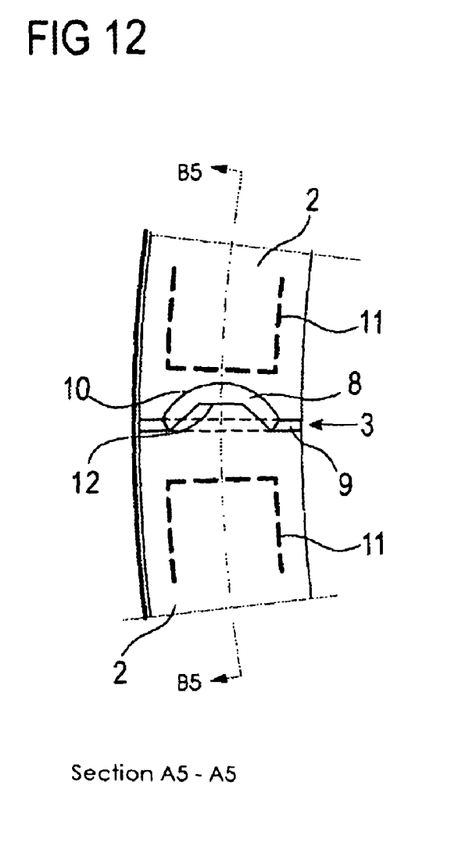
FIG. 12 shows a joint between two cylinder segments in horizontal section with unequally shaped, interlocking butting edges, additionally with reinforcement in the region of the butting edges.
Figure 13:
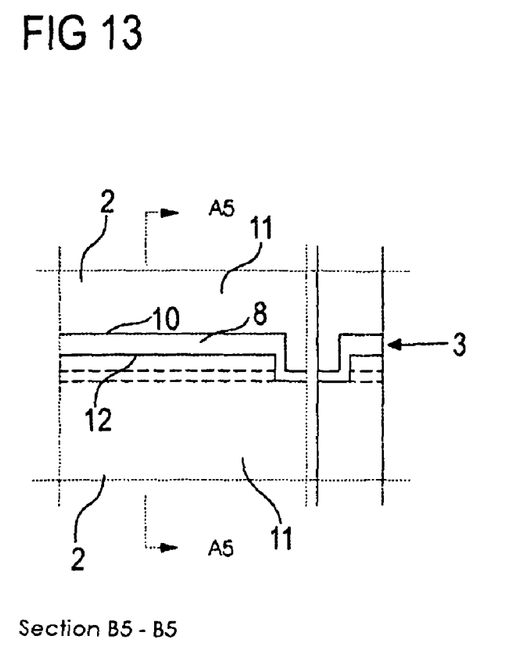
FIG. 13 shows a vertical section through the joint of FIG. 12.

A further detail feature of the tower construction according to the invention is represented in FIGS. 12 and 13. FIG. 12 shows two cylinder segments 2, again in the joint region in horizontal cross section, where the upper cylinder segment 2 at the joint 3 again has a semicircular groove 10 in which there engages a trapezoidal elevation 12 of the cylinder segment 2 situated opposite. This shaping in the joint region also achieves a certain rotational capacity about the axis of the joint 3, it also being possible here to insert joint filling material 8 in the joint gap. To stiffen and strengthen the edge regions of the cylinder segments, a reinforcement 11 is additionally introduced into the cylinder segments, with the result that the edge regions of the cylinder segments can withstand higher loads.

FIG. 13 once again shows the joint of FIG. 12, but in vertical section. Just as in FIG. 12, here too there is provided an additional positive lock in the vertical direction, in which the groove region, together with the corresponding elevation on the other side of the cylinder segment, extends only over a portion of the entire height of the cylinder segment and thereby once again forms a positive lock.

It goes without saying that the aforementioned features of this invention can be used not only in each of the combinations specified but also in other combinations or in isolation without departing from the scope of the invention.

LIST OF REFERENCE NUMBERS

1 Component cylinder
2 Cylinder segment
3 Joint between cylinder segments
4 Annular bracing
5 Joint between component cylinders
6 Vertical bracing elements
7 Shaped part
8 Joint filling material
9 Free joint gap
10 Groove
11 Reinforcement
12 Elevation

The invention claimed is:

1. A tower construction with an annular cross section, comprising:
a component tube that includes at least three tube segments, wherein:
the tube segments are prestressed relative to one another by a segment bracing device,
a component tube bracing device extends either above or below one tube segment of the tube segments,
adjacent tube segments form joints with gaps at butting edges of the adjacent tube segments,
the gaps are filled at least in part with a joint filling material,
the joint filling material is an elastic filling material at least in some joints, and
the joints are configured to allow a certain rotation of the adjacent tube segments about a joint axis.

2. The tower construction as claimed in claim 1, wherein at least one joint between at least two tube segments extends in a vertical direction.

3. The tower construction as claimed in claim 1, wherein at least one joint between at least two tube segments extends obliquely.

4. The tower construction as claimed in claim 1, wherein vertical and/or horizontal butting edges are formed at least in part in such a way that they form, directly or with the aid of an additional shaped element, a positive locking connection which acts in at least one direction.

5. The tower construction as claimed in claim 1, wherein the component tube bracing device extends at least in part inside a wall of the tube segment.

6. The tower construction as claimed in claim 1, wherein the component tube bracing device extends at least in part outside a wall of the tube segment.

7. The tower construction as claimed in claim 1, wherein the component tube bracing device is at least in part bonded to the tube segment.

8. The tower construction as claimed in claim 1, wherein the component tube bracing device is at least in part unbonded to the tube segment.

9. The tower construction as claimed in claim 1, wherein the segment bracing device extends at least in part inside walls of the tube segments.

10. The tower construction as claimed in claim 1, wherein the segment bracing device extends at least in part outside walls of the tube segments.

11. The tower construction as claimed in claim 1, wherein the segment bracing device is at least in part bonded to the tube segments.

12. The tower construction as claimed in claim 1, wherein the segment bracing device is at least in part unbonded to the tube segments.

13. The tower construction as claimed in claim 1, wherein different joints have different joint filling material.

14. The tower construction as claimed in claim 1, wherein adhesive serves at least in part as the joint filling material.

15. The tower construction as claimed in claim 1, wherein mortar serves at least in part as the joint filling material.

16. The tower construction as claimed in claim 1, wherein the joint filling material consists at least in part of sheeting.

17. The tower construction as claimed in claim 1, wherein the joint filling material has different properties over a cross section of a filled joint.

18. The tower construction as claimed in claim 1, wherein the joints of the tube segments extending along a wall in a vertical direction are arranged in alignment with one another.

19. The tower construction as claimed in claim 1, wherein positive locking connections comprise, at least in part, interlocking profiles between the tube segments.

20. The tower construction as claimed in claim 1, wherein positive locking connections comprise, at least in part, mutually complementary profiles between the tube segments.

21. The tower construction as claimed in claim 1, wherein positive locking connections comprise, at least in part, mutually inter-engaging non-complementary profiles between the tube segments.

22. The tower construction as claimed in claim 1, wherein, with a positive locking connection between the tube segments, a tongue and groove connection is formed by an additional shaped element.

23. The tower construction as claimed in claim 1, wherein an optionally present shaped element for a positive locking connection between the tube segments consists of the same material as the tube segments.

24. The tower construction as claimed in claim 1, wherein an optionally present shaped element for a positive locking connection between the tube segments consists of a material other than that of the tube segments.

25. The tower construction as claimed in claim 1, wherein the tube segments are produced from fiber concrete.

26. The tower construction as claimed in claim 1, wherein the tube segments have reinforcement at least in the region adjoining the joints.

27. The tower construction as claimed in claim 1, wherein the tube segments have reinforcement exclusively in the region adjoining the joints.

28. The tower construction as claimed in claim 1, wherein vertical joints are dispensed with at least one end of the tower construction.

29. The tower construction as claimed in claim 1, wherein vertical joints are dispensed within a region of openings.

30. The tower construction as claimed in claim 1, wherein a plurality of component tubes are arranged concentrically on top of one another.

31. The tower construction as claimed in claim 30, wherein at least some of the component tubes used have a cylindrical design.

32. The tower construction as claimed in claim 30, wherein at least some of the component tubes used have a conical design.

33. The tower construction as claimed in claim 1, wherein the tower construction is part of a wind power installation.

34. The tower construction as claimed in claim 1, wherein the tower construction is part of a telecommunications installation.

35. The tower construction as claimed in claim 1, wherein the tower construction is designed as a chimney.

36. The tower construction as claimed in claim 1, wherein the tower construction is designed as a cooling tower.

* * * * *